United States Patent [19]

Kattner et al.

[11] 4,112,435

[45] Sep. 5, 1978

[54] PROTECTIVE AND CLEANING DEVICE FOR WRITING HEADS IN INK RECORDER DEVICES

[75] Inventors: Erich Kattner; Güenter Rosenstock, both of Munich, Germany

[73] Assignee: Siemens Aktiengesellschaft, Berlin & Munich, Germany

[21] Appl. No.: 769,099

[22] Filed: Feb. 16, 1977

[30] Foreign Application Priority Data

Feb. 23, 1976 [DE] Fed. Rep. of Germany ....... 2607313

[51] Int. Cl.$^2$ ........................................ G01D 15/18

[52] U.S. Cl. ........................................ 346/140 R

[58] Field of Search .............................. 346/75, 140 R

[56] References Cited

U.S. PATENT DOCUMENTS 3,346,869 10/1967 Stone .................................... 346/75

*Primary Examiner*—George H. Miller, Jr.
*Attorney, Agent, or Firm*—Hill, Gross, Simpson, Van Santen, Steadman, Chiara & Simpson

[57] ABSTRACT

A protective and cleaning combination shield and wiper for ink jet recording device writing heads is provided which consists of a shield member mounted on the writing head and movable between a blocking position in front of the orifices of the writing head and an operating position spaced from and clear of the orifices. The shield is equipped with a resilient wiping arm which wipes across the face of the writing head during movement between the positions.

9 Claims, 3 Drawing Figures

PROTECTIVE AND CLEANING DEVICE FOR WRITING HEADS IN INK RECORDER DEVICES

BACKGROUND OF THE INVENTION

1. Field of the Invention

This invention relates to ink recording devices and more particularly to a combination shield and wiper for the writing head of such devices.

2. Prior Art

Some recording devices, such as high speed printers and the like, include ink jet devices which have a moving writing head which dispenses bursts of ink from a number of orifices in the writing head, the ink being directed at a record carrier medium such as paper which is in opposition to an end face of the writing head.

In such ink recording devices the writing head may be moved lengthwise along a writing head carrier with the movement controlled by a drive device. The writing head can, in some presently used embodiments, consist of a mosaic head in which a plurality of piezoelectrically driven writing jets are positioned in a mosaic pattern.

The writing jets of such devices may be supplied with writing fluid or ink from an ink supply and the individual jets activation is controlled by a character generator. The jets of the writing head are formed by somewhat cylindrical bores which are surrounded by piezoelectric drive elements. The operating open ends of the bores are located at an end face of the writing head and a nozzle plate may be provided on the end face, the nozzle plate having a number of openings therethrough defining the bore exits.

In normal practice, writing heads of the above-described type are positioned in close spaced relationship to the record carrier, which may for example be a roll of paper. Due to this close positioning, often times dirt will be lodged against the nozzle plate with attendant adverse operating results. Such dirt contamination of the nozzle plate is frequently encountered during paper change or change of such other record carriers as may be used in the particular construction. Examples of other record carriers used are films, fabrics and the like.

Additionally, during changing of the record carrier, since it must be paired in close proximity to the writing head, and since the writing head is normally filed with ink, it is possible for the record carrier itself to become soiled by the ink.

It would therefore be an advance in the art if such ink writing devices as above described could be provided with mechanism which protects both the record carrier and the writing head from soiling during those times when the writing head is not being used and when the carrier is being changed. It would also be an advance in the art to provide method and apparatus for cleaning, automatically, the nozzle plate or other end face of the writing head.

SUMMARY OF THE INVENTION

It is therefore a primary object of this invention to provide a device which protects the outlet openings of the individual writing jets of the writing head of an ink recorder apparatus from contamination and simultaneously protects the record carrier from contamination from ink leakage from the writing head.

It is also an objective to provide a device for cleaning the nozzle plate or other end face of the writing head.

These objects are met through the provision of an ink deflector shield which is movable, by means of an electric drive mechanism acting against a spring force, between a blocking position and an operating position. The deflector shield has a resilient wiper element attached thereto, the wiper element moving over the writing head openings during movement between the two positions.

In the described embodiment of the invention, a lever arm is attached to the writing head and is swingable under influence of an electric drive mechanism and a spring between the blocking and operating positions. The deflector shield and wiper element are attached to the lever arm. The drive mechanism may consist of an electromagnet and the movement range of the lever arm may be restricted by stops.

Such a construction has the advantage of simultaneously protecting the writing head from becoming dirty while at the same time, in case the writing head has become dirty, assuring that it will be cleaned.

In the preferred embodiment, the connection to the drive mechanism is such that it will be actuated to swing the shield and wiper clear of the writing head each time the writing head is put into operation and to return them to the blocking position when operation of the writing head ceases. The wiper element is designed to wipe the nozzle plate during each movement of the deflector shield whereby the wiper element will sweep the nozzle plate immediately before actuation of the writing head.

By use of a spring member and the disclosed electromagnet, it can be assured that whenever the apparatus is turned off, or whenever the housing cover is opened in order to allow changing of the record carrier, the ink deflector shield and the wiper element will move, under the influence of the spring, to a position in front of the writing head thereby protecting the jet openings from the record carrier and the record carrier from accidental ink contamination. Thereafter actuation of the writing mechanism, or closing of the housing cover, as the case may be, will activate the drive mechanism to move the shield to a withdrawn position out of the way of the writing head and, during this movement, the wiping element will wipe the face of the writing head.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
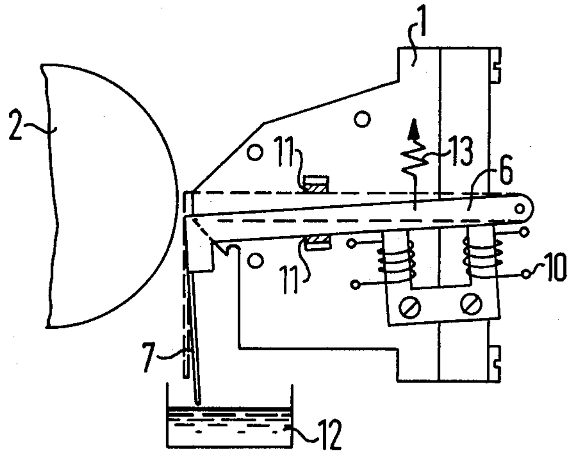
FIG. 1 is a fragmentary diagrammatic representation of a writing head equipped with the combination shield and wiper of this invention.

As basically illustrated in FIG. 1, a writing head 1 of a jet ink pattern or mosaic recording assembly is suspended on a carrier mechanism positioned in close proximity to a platen 2. By means of a drive mechanism, not shown, the writing head will be moved across the platen lengthwise of the platen.

The writing head includes a number of channels 3 which are surrounded by piezoelectric drive elements. The channels are supplied with writing fluid from an ink supply (not shown). In the type of writing head illustrated, the outlet end of the writing head is closed opposite the platen 2 by a nozzle plate 5. The nozzle plate is equipped with a large number of bore openings for communicating to the channels 3. In producing a writing or other indicia on the record carrier which passes over the platen 2, the piezoelectric drive elements will selectively jet ink from one or more of the channels 3 at discreet timed intervals during movement of the writing head 1 lengthwise of the platen. Inasmuch as the control mechanism for the writing head are known to the art and form no part of this invention, they are not hereinafter described.

In order to protect the record carrier from accidental contamination from the writing head, as well as to protect the writing head from dirt accumulation, we have provided a lever arm 6 attached to the writing head 1. The lever arm 6, which may be made of metal is pivotably attached to the writing head as indicated on the right hand side of FIG. 1. An ink deflector shield 7 is attached to the lever arm 6 as indicated on the left hand side of FIG. 1.

The deflector shield may also be constructed of metal if desired and may have attached thereto a resilient metal flap 8 with an end portion 9 which is urged by the resiliency of the flap 8 into contact with the nozzle plate 5.

Electromagnet 10 may be used to actuate the lever arm 6 to move the shield 7 and wiper element 8 within limits which may be controlled by the positioning of elastomeric bumper stops 11.

Positioning of the stops 11 can determine both a shield or blocking position and an operating position, the shield and wiper being moved to the operating position whenever the writing head is to be used and being returned to the blocking position when the writing head is not to be used.

Figure 2:
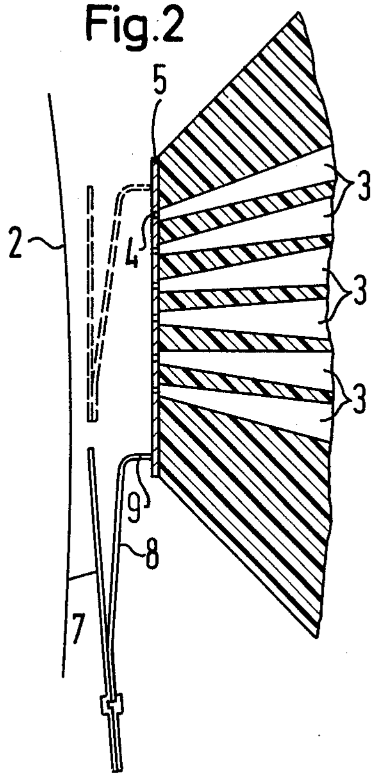
FIG. 2 is a cross-sectional view, on a vastly enlarged scale, of the nozzle end of the writing head and the shield and wiper of this invention illustrating, by broken lines and solid lines the blocking and operating positions.
Figure 3:
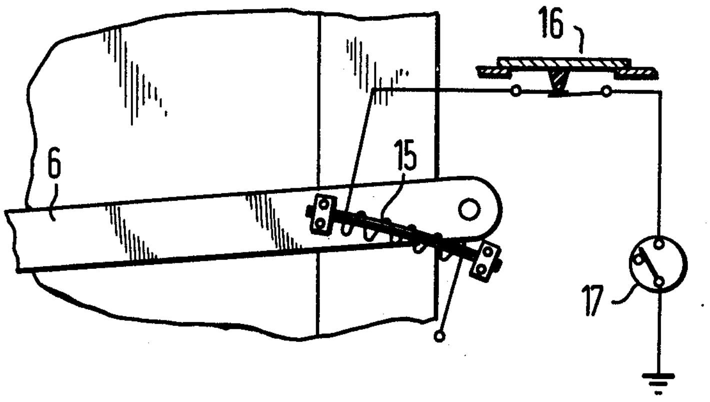
FIG. 3 is a fragmentary representation of a modification of the shield drive.

Thus, for writing operations, when the writing head is to be used, the deflector shields 7 and wiper element 8 will be moved by the drive mechanism, such as the electromagnet 10 from the blocking position illustrated in broken lines in FIG. 2 to the operating position illustrated by the solid lines of FIG. 2. In the course of movement between the two positions, the edge 9 of the wiper element 8 will wipe the nozzle plate 5 thereby cleaning it of any existing ink leakage or build up or of any dirt which has adherred to the nozzle plate. Ink or contaminants removed by the wiper 9 can then run therealong and drop to a container 12 positioned below the writing head.

After completion of the writing operation, or when the writing operation is to be interrupted to change the record medium, the current supply to the electromagnet may be interrupted. As a result of current interruption, the deflector shield 7 with wiper element 8 will be automatically returned to the blocking position by means of the spring 13. When in the blocking position, both the jet openings of the writing head and the platen 2 will be protected thereby allowing insertion of the new record carrier without either contaminating the writing head or the record carrier.

As a cleaning aid, when the shield is in the blocking position, it is possible to increase ink flow through the channels 3, either by actuating all of the piezoelectric drives or by increasing pressure on the container supplying ink to the channels 3, or both to cause a burst flow of ink through the nozzle openings which ink will be deflected by the shield to the container 12. This burst flow or ink will therefore open any blocked nozzle openings 4 in the plate 5.

In those embodiments where the addition of an electromagnet may provide weight problems, other drive mechanisms can be utilized. As an example, the electromagnet 10 can be replaced by a heatable bimetalic strip or coil 15 which can also control movement of the lever arm 6. Although such a construction would have a slower reaction time than an electromagnet, it avoids the attendant acceleration jars caused by abrupt movement of the lever arm between the stops 11. The coil 6 can be connected to a circuit which includes a cover opening actuated switch 16 to break the circuit when the cover is opened to change the record carrier and a writing head on-off switch 17 which breaks the circuit when the writing head is off.

Due to the extreme simplicity of our herein described device, the device is essentially maintenance free and makes it possible, in an economical manner, not only to protect the outlet openings 4 of the writing head from contamination but to, in addition, clean them, both by providing the wiping element 9, and by providing a construction which allows pressure burst cleaning of the outlets 4 of the writing head.

It will therefore be seen from the above that our invention provides a combination writing head shield and wiper for use in ink recording apparatus of the type disclosed. The combination shield and wiper is mounted on a lever arm pivotably attached to the writing head, the lever arm movable between writing head blocking and operating positions by means of an electric drive member, the shield having a resilient wiping element which wipes across the face of the writing head during movement of the shield between two positions.

Although the teachings of our invention have herein been discussed with reference to specific theories and embodiments, it is to be understood that these are by way of illustration only and that others may wish to utilize our invention in different designs or applications.

We claim as our invention:

1. In an ink recording device having a writing head with a plurality of ink dispensing openings therein, the improvement of a shield device attached to the writing head, the shield device including a shield member positioned in front of the writing head and moveable between a blocking position opposed to the openings and an operating position away from the openings the shield member having a resilient means attached thereto, the resilient means having a wiping face associated therewith, the wiping face urged into contact with an end face of the writing head under spring action of the resilient means, movement of the shield from the blocking to the operating position causing movement of the wiping face across an end face of the writing head.

2. In an ink recording device having a writing head with a plurality of ink dispensing openings therein, the improvement of a shield device attached to the writing head, the shield device including a shield member positioned in front of the writing head and moveable between a blocking position opposed to the openings and an operating position away from the openings, the shield member when in the blocking position being in spaced relation to the openings whereby ink may be dispensed from the openings and deflected by the shield member when the shield member is in the blocking position.

3. A device for protecting and cleaning the outlet openings of an ink recorder writing head which comprises a deflector shield carried by the device, the deflector shield movable by a drive means from a writing head outlet opening blocking position to an operating position clear of the writing head outlet openings, a spring means to return the shield to the blocking position, a wiper element having a wiping face resiliently urged against the outlet openings, the wiper element attached to the shield, and movement of the shield between the positions causing the wiping face to wipe across the outlet openings.

4. A device according to claim 3 wherein a lever arm is pivotably attached to the writing head and has the shield attached thereto at a point remote from the pivotable connection, movement of the lever arm being limited by abutment stops carried by the writing head.

5. A device according to claim 4 wherein the drive mechanism comprises an electromagnet.

6. A device according to claim 4 wherein the drive mechanism comprises a heatable bimetallic strip.

7. A device according to claim 3 wherein activation of the drive means moves the shield from the blocking position to the operating position and deactivation of the drive means allows the spring to return the shield to the blocking position.

8. A device according to claim 7 wherein circuitry is provided deactivating the drive means when a housing cover is opened.

9. A device according to claim 8 wherein circuitry is provided activating the drive means whenever the recorder is actuated.

* * * * *